3,558,718
PROCESS OF STABILIZING TRIALKYL BORANES
Albert Gross, Frankfurt am Main, Germany, assignor to Kulzer & Co. G.m.b.H., Bad Homburg, Germany, a corporation of Germany
No Drawing. Filed May 22, 1968, Ser. No. 731,263
Claims priority, application Germany, May 24, 1967, K 62,362
Int. Cl. C07f 5/02; B01j 11/82
U.S. Cl. 260—606.5      2 Claims

ABSTRACT OF THE DISCLOSURE

Trialkyl boranes are prevented from spontaneously igniting by adding thereto a stabilizing agent comprising an organic compound of divalent sulfur. These stabilized compounds find utility as catalysts.

---

This invention relates to a process of preventing inflammation of trialkyl boranes.

Trialkyl boranes of the general formula B(alkyl)$_3$ are generally colorless liquids which are miscible with most organic solvents but insoluble in water. Especially the lower members of this series of compounds are oxidized spontaneously in the presence of oxygen with inflammation. Trialkyl boranes have found a great number of important uses in the last years because, for example, they accelerate the polymerization of vinyl monomers such as compounds of the acrylic acid series or vinyl chloride or olefins such as ethylene catalytically, isomerize olefins and are important intermediate products for the production of primary alcohols. In addition, they are also used in the form of their amine complexes as corrosion inhibitors and also as polymerization catalysts for the production of silicone rubber.

For all uses of the trialkyl boranes, their sensitivity to oxygen is found to be extremely aggravating because triethyl borane, for example, undergoes spontaneous inflammation at a partial pressure of as low as less than 1 mm. Hg. at 0° C. in the presence of oxygen and burns with a green flame according to the equation

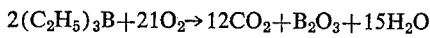

$$2(C_2H_5)_3B + 21O_2 \rightarrow 12CO_2 + B_2O_3 + 15H_2O$$

While the ignition temperature increases as the number of carbon atoms in the alkyl groups increases, even the ignition temperature of tributyl borane which is 88° C. is still very low as compared with triethyl borane which is inflammed at −20° C. under atmospheric pressure. Therefore, trialkyl boranes must always be handled with particular caution and, when used, special precautionary measures such as hoods having satisfactory draft are indispensable because the compounds remain always spontaneously inflammable even when largely diluted if the diluent is adsorbed in any way. For example, filter paper very rapidly catches fire when slurrying a trialkyl borane with Vaseline to form a paste and spreading this paste on filter paper.

It is long known that the oxidation of trialkyl boranes proceeds in steps through borinic acid esters and boronic acid esters as intermediate compounds. Of these, the borinic acid esters are still capable of being readily oxidized by atmospheric oxygen. However, the efficiency of the trialkyl boranes for many uses is not reached either by the borinic or the boronic acid esters. Therefore, it is an object of the present invention to find a stabilizer for trialkyl boranes which, without detrimentally affecting the efficiency of the trialkyl boranes, is capable of preserving their essential properties to an extent that they may still be used in the stabilized form successfully, i.e. in the form in which they are no longer spontaneously inflammable in the presence of oxygen.

It is known from work done by Abraham and Davies (Chem. Soc., 1959, page 434) that primary aliphatic amines exert an oxidation-inhibiting action on trialkyl boranes. Borane-amine complexes containing various amines have also been studied (M. F. Lapert, Chem. Rev., 56, p. 1031). However, these compounds were found to be either insufficiently stabilized in that they were ignited very rapidly when spread on filter paper or their efficiency in various reactions, e.g. in the polymerization was detrimentally affected to such an extent that the same efficiency as that of the non-stabilized compounds was not reached.

It has now been found surprisingly that mixtures of trialkyl boranes, especially compounds having up to six carbon atoms in the alkyl group, with organic compounds of divalent sulfur behave extremely favorably, undergo no spontaneous inflammation, do not inflame filter paper when spread thereon, and, in addition, virtually do not detrimentally affect the efficiency of the trialkyl boranes, especially in the polymerization of unsaturated compounds.

The new process of preventing inflammation of trialkyl boranes is characterized in that organic compounds of divalent sulfur dissolved in the trialkyl boranes are used as stabilizers.

Various classes of compounds such as alkyl mercaptans, alkyl disulfides, dialkyl sulfides, alkyl mercaptoacetic acid esters and thiophenols have been found to be suitable organic compounds. Dodecyl mercaptans, i.e. tertiary dodecyl-mercaptans, ethyl disulfide, dodecyl disulfide, dodecyl butyl sulfides, diethyl sulfide, thiodiacetic acid ethyl ester, dodecyl mercaptoacetic acid ester, dithioglycolic acid or t-butyl thiophenol can be used with particular advantage. The quantity of stabilizer is dependent on which the trialkyl boranes are present as such or diluted in mixture with an inert material which as such is not a stabilizer. For example, while undiluted tri-n-butyl borane requires at least 30 to 35% by weight of a sulfur compound for stabilization, substantially smaller amounts of, for example, 5% by weight, based on borane, are sufficient for the mixture of 40 parts of tributyl borane and 30 parts of dibutyl phthalate if the latter is, for example, sumultaneously present as an inert material. The minimum amounts which are necessary can be rapidly established by the skilled artisan in a preliminary experiment, e.g. by spreading the mixture on filter paper.

The insensitivity of the stabilized trialkyl boranes to oxygen is maintained even if they are used in mixture with other substances, e.g. polymerization catalysts or promotors or accelerators. If a catalyst paste containing as catalyst system a redox system and tributyl borane and being diluted with Vaseline is spread on filter paper, the paper catches fire within a few seconds and becomes charred. However, if the same catalyst paste contains additionally 35% by weight of dodecyl mercaptan, based on tributyl borane, discoloration of the paper suggesting inflammation of the tributyl borane cannot be observed even after an extended period of time. The catalyst paste when kept in a closed vessel does not show a loss in catalytic activity even when stored for an extended period of time.

However, it is to be observed expressly that the organic compounds of divalent sulfur have merely an influence on the spontaneous inflammability of the trialkyl boranes while, for example, the catalytic activity of these compounds is lost when allowed to stand in the air, i.e. the stabilizing effect is not a true one.

What is claimed is:

1. A process for preventing inflammation of trialkyl boranes having up to six carbon atoms in each of its alkyl groups, comprising using dodecyl mercaptan as a stabilizing agent dissolved therein.

2. A trialkyl borane composition stabilized against spontaneous inflammability as determined by spreading said composition on filter paper and exposing it to air, comprising a trialkyl borane having up to six carbon atoms in each of its alkyl groups containing dissolved therein a spontaneous inflammability retarding amount of dodecyl mercaptan.

References Cited

UNITED STATES PATENTS

| | | | |
|---|---|---|---|
| 3,352,894 | 11/1967 | Crain et al. | 260—606.5 |

FOREIGN PATENTS

| | | | |
|---|---|---|---|
| 549,075 | 11/1942 | Great Britain | 260—606.5 |
| 618,358 | 2/1949 | Great Britain | 260—606.5 |

OTHER REFERENCES

Stone et al., J. Inorg. Nuc). Chemistry, vol. 3, (1956), pp. 164, 165, 166, 167, 175, 260-606.5.

Steinberg et al., Progress in Boron Chemistry, (1954), pp. 114-5.

TOBIAS E. LEVOW, Primary Examiner

W. F. W. BELLAMY, Assistant Examiner

U.S. Cl. X.R.

252—432